E. WHITLOW.
BUNDLE CARRIER ATTACHMENT FOR HARVESTERS.
APPLICATION FILED MAR. 7, 1917.

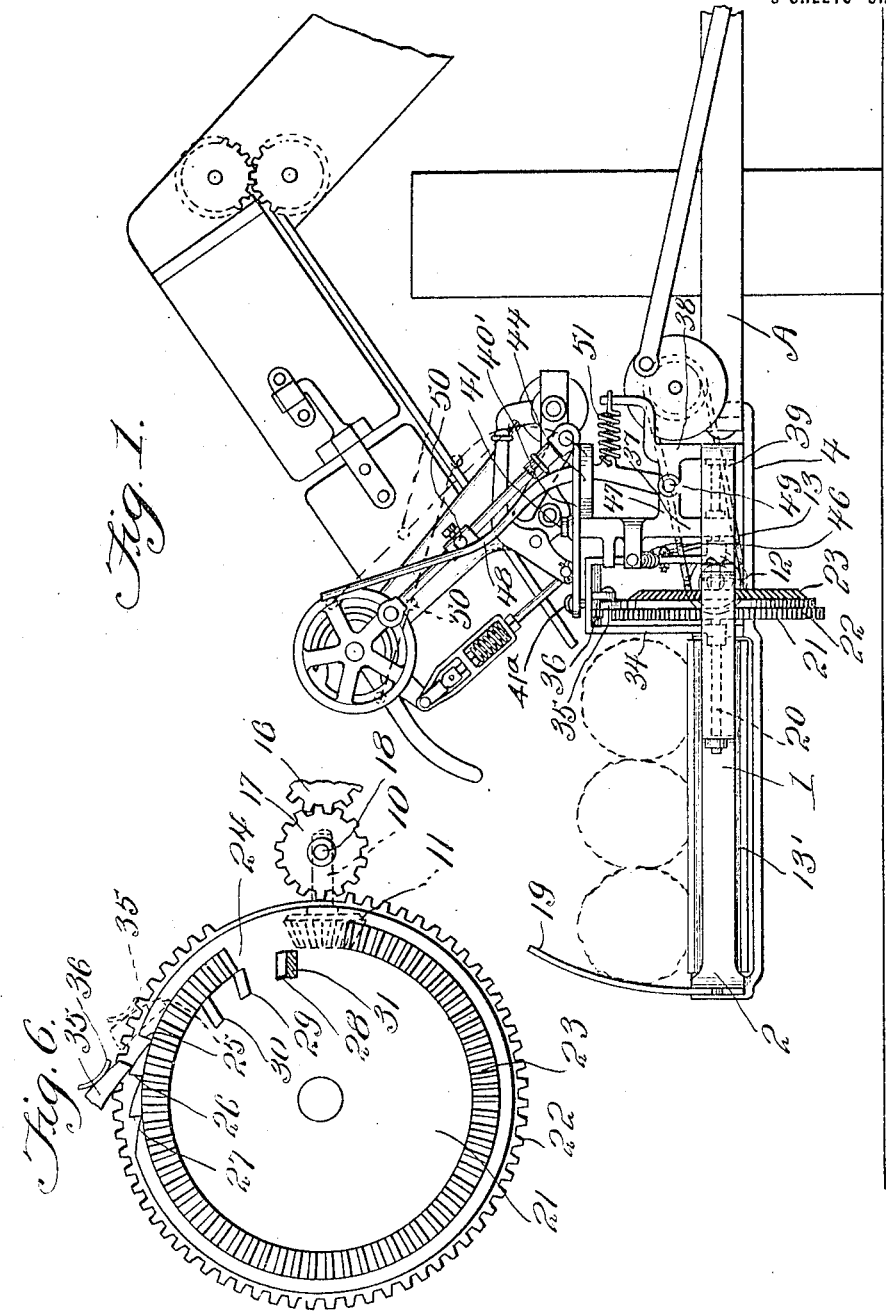

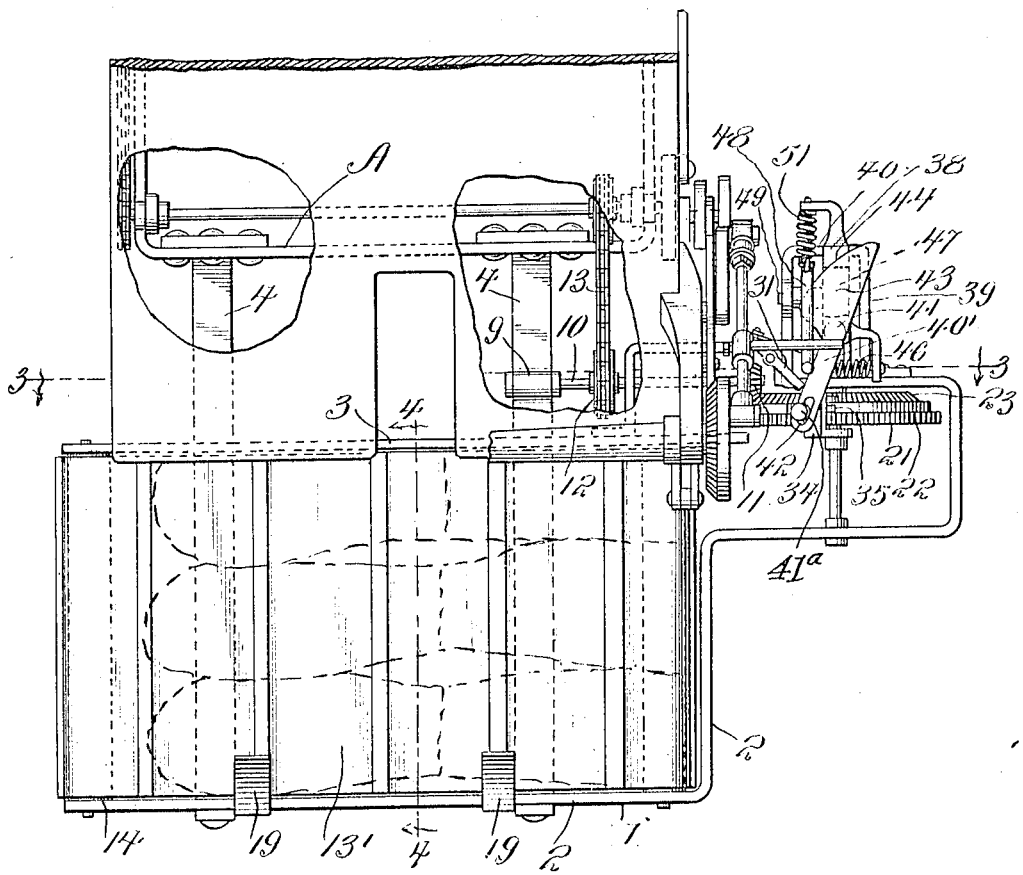
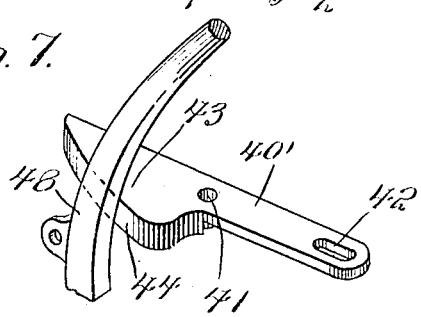

1,256,410.

Patented Feb. 12, 1918.
3 SHEETS—SHEET 3.

WITNESSES
J. L. Wright
J. W. Garner

INVENTOR
E. Whitlow
BY Victor J. Evans,
ATTORNEY

UNITED STATES PATENT OFFICE.

EARL WHITLOW, OF JERSEYVILLE, ILLINOIS.

BUNDLE-CARRIER ATTACHMENT FOR HARVESTERS.

1,256,410.   Specification of Letters Patent.   Patented Feb. 12, 1918.

Application filed March 7, 1917. Serial No. 153,021.

*To all whom it may concern:*

Be it known that I, EARL WHITLOW, a citizen of the United States, residing at Jerseyville, in the county of Jersey and State of Illinois, have invented new and useful Improvements in Bundle-Carrier Attachments for Harvesters, of which the following is a specification.

This invention is an improved bundle carrier adapted to be attached to and automatically operated by a harvesting machine, such for instance, as the McCormick and by means of which the driver is relieved of the necessity of watching the bundle carrier, and is also relieved of the necessity of tripping the bundles.

The invention consists in the construction, combination and arrangement of devices hereinafter described and claimed.

In the accompanying drawings:

Figure 1 is a front elevation of my improved bundle carrier, showing the same attached to the binder supporting end of a harvester.

Fig. 2 is a plan of the same.

Fig. 6 is a detailed elevation of the master gear and associated gears.

Fig. 7 is a detailed perspective view of the levers 40' and 48.

Figure 3:
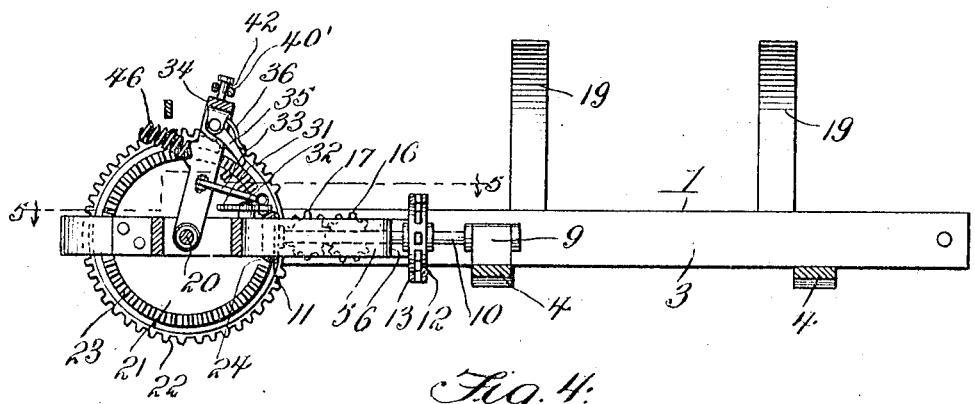
Fig. 3 is a vertical sectional view of the same taken on the plane indicated by the line 3—3 of Fig. 2.
Figure 4:
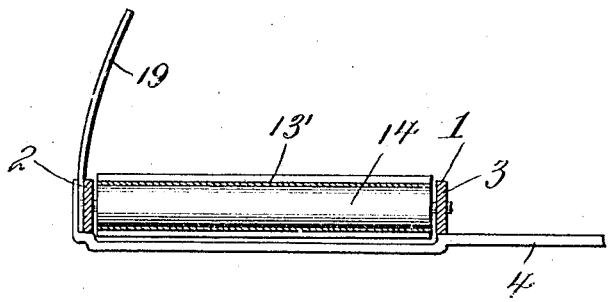
Fig. 4 is a transverse sectional view of the same taken on the plane indicated by the line 4—4 of Fig. 2.
Figure 5:
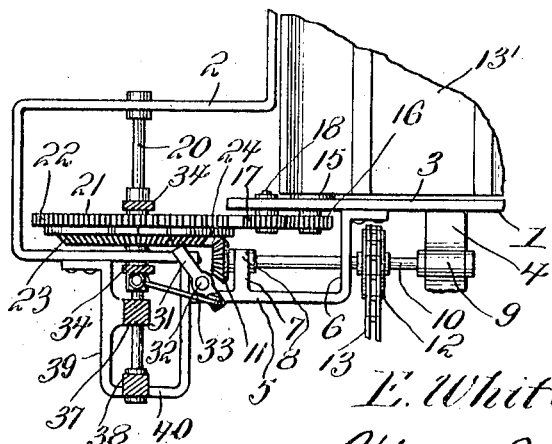
Fig. 5 is a detailed plan, partly in section, on the line 5—5 of Fig. 3.

In the embodiment of my invention I provide a frame 1 of oblong rectangular form and which is here shown as comprising outer and inner bars 2, 3, the latter shorter than the former, and a pair of bars 4 which are arranged transversely under and are attached to the said bars 2, 3 and project inwardly from the frame 1 and serve for the attachment of said frame to the frame A of a harvesting machine. The frame 1 is also provided with a forwardly extending arm 5 which is connected to the bar 3 by a portion 6. A standard 7 on the arm 5 has a bearing 8. One of the bars 4 has a bearing 9 arranged in line with and spaced from the bearing 8. A shaft 10 is mounted in said bearings, is provided at its front end with a pinion 11 and is also provided with a sprocket wheel 12 which is connected by an endless sprocket chain 13 with a similar sprocket wheel on the shaft of the harvester which runs the sickle driver. Hence the shaft 10 is continuously rotated with its pinion 11 while the harvesting machine to which the bundle carrier is attached is in operation.

The frame 1 is provided with an endless carrier or platform 13' which is made of canvas or other suitable material and which is stretched between a pair of rollers 14, 15 the shafts of which are mounted in bearings in the sides of the bundle carrier frame or platform. The shaft 15 is provided at its inner end with a spur gear 16 which is engaged by a similar gear 17 which is mounted for rotation on a stub shaft 18 with which the bundle carrier frame is provided. At the outer side of the bundle carrier frame are upwardly and inwardly inclined guard standards 19 to prevent the bundles of grain from casually falling off.

A shaft 20 is mounted in bearings in the bar 2 and arm 5 and is provided with a master gear 21 which has peripheral spurs 22 on one side which engage the gear 17. The master gear is also provided with crown teeth 23 which extend nearly but not entirely around the master gear, a space 24 being provided on the crown geared side of the master gear. Normally the master gear is stationary and is arranged so that the gear 11 is opposite the space 24 and hence is disengaged from the master gear. The master gear is provided on the upper side with a series of ratchet teeth 25, 26, 27, any suitable number of such ratchet teeth being provided according to the number of bundles to be accumulated on the bundle carrier before being dropped from the latter. The master gear is also provided on its inner side with a corresponding number of stop projections 28, 29, 30. A stop lever 31 is pivotally mounted as at 32 on the arm 5 and normally engages behind the stop projection 28 to prevent reverse rotation of the master gear. This stop lever is connected by a link 33 with the inner arm of an inverted U-shaped yoke 34 which is pivotally mounted on the shaft 20 and which is arranged astride of the upper side of the master gear and is adapted for rocking movement. A pawl 35 is pivotally mounted in the upper portion of the yoke and by means of a spring 36 is normally engaged behind the ratchet tooth 26. A pair of standards 37, 38 are held in fixed position by suitable braces 39, 40 and have bearings at their lower ends for the shaft 20. A lever 40' is pivotally mounted on the upper end of the standard 37, as at 41 and is connected to the cross bar which forms the top of the yoke by a stud 41ª which operates in a slot 42 of lever and the said lever is provided on its inner side at its inner end with a cam 43 which presents an oblique cam surface 44. A spring 46 is connected to the yoke and serves to hold the latter in normal position and cause said yoke to normally hold the cam lever in vertical position. A cross bar 47 connects standards 37, 38 and a lever 48 is pivotally mounted on said cross bar at 49, is arranged for movement toward and from the cam end of a cam lever and is operated by an arm 50 which is attached to the pitman of the harvester so that when a bundle is discharged from the harvester the said lever is moved outwardly and caused to engage the cam of the cam lever and to move past the same and in so doing cause the yoke to be turned a sufficient distance to cause the dog or pawl by engagement with the tooth 25 of the master gear to partly turn said master gear. A spring 51 is connected to the lever 48 to impart reverse movement to the latter and the spring which is connected to the cam lever thereupon returns the latter to its normal position with its cam in the path of the lever 48 and in so doing engages the dog behind the next ratchet tooth.

The first movement of the yoke causes the stop lever 31 to be turned out of engagement with one of the stop projections of the master gear and hence permit partial rotation of the latter.

In the operation of my improved bundle carrier the master gear is partly turned by the means and in the manner above described as each bundle is discharged from the harvester, the bundles falling on the endless platform of the bundle carrier and accumulating thereon. Such successive step by step movements of the master gear continue to occur until the required number of bundles have been thus disposed and thereupon the crown teeth of the master gear are engaged by the constantly rotating pinion 11, said pinion imparting nearly a complete rotation to the gear and the latter by the gear connection 16, 17 hereinbefore described operating the endless platform of the bundle carrier and hence causing all the bundles to be dropped from the rear end of the bundle carrier on the platform.

While I have herein shown and described a preferred form of my invention I would have it understood that changes may be made in the form, proportion and construction of the several parts, without departing from the spirit of my invention and within the scope of the appended claims.

Having thus described my invention, what I claim is:

1. In a bundle carrier, an endless movable carrier element, means including a master gear to operate the carrier element, said master gear having a gear segment and also having ratchet teeth, a member mounted for rocking movement, a dog carried by said member and arranged to successively engage the ratchet teeth of the master gear, and means to actuate said rocking member and thereby impart step by step partial rotation to the master gear to engage the gear segment thereof with the pinion and thereby cause the master gear to be turned by the pinion and to operate the carrier element.

2. In a bundle carrier, an endless movable carrier element, means including a master gear to operate the carrier element, said master gear having a gear segment and also having ratchet teeth, a member mounted for rocking movement, a dog carried by said member and arranged to successively engage the ratchet teeth of the master gear, and means to actuate said rocking member and thereby impart step by step partial rotation to the master gear to engage the gear segment thereof with the pinion and thereby cause the master gear to be turned by the pinion and to operate the carrier element, and means to prevent casual movement of the master gear.

3. In a bundle carrier an endless movable carrier element, means including a master gear to operate the carrier element, said master gear having a gear segment and also having a series of ratchet teeth, a continuously driven pinion normally disengaged from the segment, a member mounted for rocking movement, a dog carried by said member and arranged to successively engage the ratchet teeth to impart step by step partial rotation to the master gear and thereby engage the gear segment thereof with the pinion, a lever connected to the rocking member and having a cam, an operating lever arranged to engage said cam and thereby cause the cam lever to impart partial rotation to the master gear, and a spring to impart reverse strokes to the rocking member.

4. In a bundle carrier an endless movable carrier element, means including a master gear to operate the carrier element, said master gear having a gear segment and also having a series of ratchet teeth, a continuously driven pinion normally disengaged from the segment, a member mounted for rocking movement, a dog carried by said member and arranged to successively engage the ratchet teeth to impart step by step partial rotation to the master gear and thereby engage the gear segment thereof with the pinion, a lever connected to the rocking member and having a cam, an operating lever arranged to engage said cam and thereby cause the cam lever to impart partial rotation to the master gear, and a spring to impart reverse strokes to the rocking member, and a spring to impart reverse strokes to said operating lever.

In testimony whereof I affix my signature.

EARL WHITLOW.

Copies of this patent may be obtained for five cents each, by addressing the "Commissioner of Patents, Washington, D. C."